US007614077B2

(12) United States Patent
Brew et al.

(10) Patent No.: US 7,614,077 B2
(45) Date of Patent: Nov. 3, 2009

(54) PERSISTENT ACCESS CONTROL OF PROTECTED CONTENT

(75) Inventors: Glenn E. Brew, Boca Raton, FL (US); Marco M. Hurtado, Boca Raton, FL (US); David Medina, Coral Springs, FL (US); Jonathan P. Munson, Putnam Valley, NY (US); Stefan Nusser, Los Altos, CA (US); Giovanni Pacifici, New York, NY (US); Alaa S. Youssef, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 10/121,033

(22) Filed: Apr. 10, 2002

(65) Prior Publication Data

US 2003/0196114 A1  Oct. 16, 2003

(51) Int. Cl.
G06F 21/00 (2006.01)
G06F 9/44 (2006.01)
H04L 9/28 (2006.01)

(52) U.S. Cl. .............................. 726/1; 726/27; 713/176; 380/281; 719/328; 711/118

(58) Field of Classification Search .................. 713/160, 713/161, 164–167, 193, 194, 200; 705/50–52, 705/59
See application file for complete search history.

(56) References Cited

U.S. PATENT DOCUMENTS

| 5,495,533 | A | * | 2/1996 | Linehan et al. ............. 713/155 |
| 5,560,008 | A | * | 9/1996 | Johnson et al. ................ 726/5 |
| 5,815,574 | A | * | 9/1998 | Fortinsky ..................... 713/153 |
| 5,931,947 | A | * | 8/1999 | Burns et al. .................... 726/4 |
| 5,933,498 | A | * | 8/1999 | Schneck et al. ............... 705/54 |
| 6,128,735 | A | * | 10/2000 | Goldstein et al. ........... 713/166 |
| 6,182,142 | B1 | * | 1/2001 | Win et al. .................... 709/229 |
| 6,185,684 | B1 | * | 2/2001 | Pravetz et al. ............... 713/182 |
| 6,205,549 | B1 | * | 3/2001 | Pravetz ....................... 713/182 |

(Continued)

OTHER PUBLICATIONS

Marshall D. Abrams And Paul B. Schneck. "Controlling Primary And Secondary Access To Digital Information". 23rd NISSC Proceedings, Oct. 16-19, 2000, Baltimore, MD.*

(Continued)

*Primary Examiner*—Christopher A Revak
(74) *Attorney, Agent, or Firm*—Jon A. Gibbons; Fleit, Gibbons, Gutman, Bongini & Bianco P.L.

(57) ABSTRACT

A system for providing persistent access control of protected content is disclosed. The method on a client system includes sending a first request for authentication of the client to a server system. Subsequently, the client is authenticated by the server. Next, a user on the client attempts to access a file comprising a trailer and content encrypted with an encrypting key. Then, a second request for access to the content is sent to the server by the client, wherein an identifier from the trailer is included in the second request. The identifier identifies the content or an access control policy of the content. The server determines that the second request is in accordance with an access control policy associated with the content, and grants access to the content. Lastly, the client accesses the content in accordance with the access control policy.

20 Claims, 11 Drawing Sheets

U.S. PATENT DOCUMENTS

| | | | |
|---|---|---|---|
| 6,237,099 B1* | 5/2001 | Kurokawa | 726/4 |
| 6,314,409 B2* | 11/2001 | Schneck et al. | 705/54 |
| 6,317,742 B1* | 11/2001 | Nagaratnam et al. | 707/9 |
| 6,324,645 B1* | 11/2001 | Andrews et al. | 713/157 |
| 6,336,115 B1* | 1/2002 | Tominaga et al. | 707/10 |
| 6,389,402 B1* | 5/2002 | Ginter et al. | 705/51 |
| 6,430,292 B1* | 8/2002 | Ito et al. | 380/280 |
| 6,446,204 B1* | 9/2002 | Pang et al. | 713/153 |
| 6,675,261 B2* | 1/2004 | Shandony | 711/121 |
| 6,824,051 B2* | 11/2004 | Reddy et al. | 235/380 |
| 6,850,252 B1* | 2/2005 | Hoffberg | 715/716 |
| 6,931,597 B1* | 8/2005 | Prakash | 715/741 |
| 6,957,261 B2* | 10/2005 | Lortz | 709/226 |
| 6,968,996 B2* | 11/2005 | Reddy et al. | 235/380 |
| 6,978,376 B2* | 12/2005 | Giroux et al. | 713/189 |
| 6,993,137 B2* | 1/2006 | Fransdonk | 380/279 |
| 7,024,391 B2* | 4/2006 | Burich | 705/51 |
| 7,124,203 B2* | 10/2006 | Joshi et al. | 709/248 |
| 7,206,765 B2* | 4/2007 | Gilliam et al. | 705/51 |
| 7,213,005 B2* | 5/2007 | Mourad et al. | 705/64 |
| 7,222,231 B2* | 5/2007 | Russell et al. | 713/165 |
| 7,290,699 B2* | 11/2007 | Reddy et al. | 235/375 |
| 7,506,102 B2* | 3/2009 | Lev-Ran et al. | 711/118 |
| 2002/0010679 A1* | 1/2002 | Felsher | 705/51 |
| 2002/0016922 A1* | 2/2002 | Richards et al. | 713/200 |
| 2002/0022982 A1* | 2/2002 | Cooperstone et al. | 705/7 |
| 2002/0026445 A1* | 2/2002 | Chica et al. | 707/100 |
| 2002/0029340 A1* | 3/2002 | Pensak et al. | 713/182 |
| 2002/0059054 A1* | 5/2002 | Bade et al. | 703/20 |
| 2002/0077985 A1* | 6/2002 | Kobata et al. | 705/51 |
| 2002/0078239 A1* | 6/2002 | Howard et al. | 709/245 |
| 2002/0078361 A1* | 6/2002 | Giroux et al. | 713/183 |
| 2002/1007798 * | 6/2002 | Kobata et al. | 705/51 |
| 2002/1007836 * | 6/2002 | Giroux et al. | 713/183 |
| 2002/0147929 A1* | 10/2002 | Rose | 713/201 |
| 2002/0178271 A1* | 11/2002 | Graham et al. | 709/229 |
| 2002/0194484 A1* | 12/2002 | Bolosky et al. | 713/189 |
| 2003/0037261 A1* | 2/2003 | Meffert et al. | 713/201 |
| 2003/0046238 A1* | 3/2003 | Nonaka et al. | 705/51 |
| 2003/0163684 A1* | 8/2003 | Fransdonk | 713/153 |
| 2003/0182236 A1* | 9/2003 | Tanaka et al. | 705/51 |
| 2003/0185395 A1* | 10/2003 | Lee et al. | 380/277 |
| 2003/0188154 A1* | 10/2003 | Dallard et al. | 713/153 |
| 2003/0217010 A1* | 11/2003 | Stefik et al. | 705/51 |
| 2004/0044779 A1* | 3/2004 | Lambert | 709/229 |
| 2004/0054854 A1* | 3/2004 | Thiyagaranjan et al. | 711/141 |
| 2004/0220880 A1* | 11/2004 | Stefik et al. | 705/59 |
| 2005/0010670 A1* | 1/2005 | Greschler et al. | 709/227 |
| 2005/0289076 A1* | 12/2005 | Lambert | 705/59 |
| 2006/0059351 A1* | 3/2006 | Jung et al. | 713/176 |
| 2006/0062426 A1* | 3/2006 | Levy et al. | 382/100 |
| 2006/0168325 A1* | 7/2006 | Wood et al. | 709/238 |
| 2006/0218646 A1* | 9/2006 | Fontijn | 726/27 |
| 2007/0233957 A1* | 10/2007 | Lev-Ran et al. | 711/118 |
| 2008/0184329 A1* | 7/2008 | Cross et al. | 726/1 |
| 2008/0244751 A1* | 10/2008 | Peinado | 726/26 |
| 2008/0250504 A1* | 10/2008 | Kwon et al. | 726/26 |

OTHER PUBLICATIONS

Menezes et al., "Handbook of Applied Cryptography", 1997, CRC Press LLC, chapter 13.4.2.*
Schneier, "Applied Cryptography: Protocols, Algorithms, and Source Code in C", 1996, John Wiley & Sons, Inc., second edition, pp. 38-39.*
U.S. Appl. No. 09/667,286, filed Sep. 22, 2000, Mourad et al.
U.S. Appl. No. 09/792,154, filed Feb. 23, 2001, Koved et al.
Abrams, Marshall D., "Persistent Access Control—Protecting and Controlling Primary and Secondary Information Distribution", The Mitre Corporation, Sep. 26, 2000, pp. 1-12.
U.S. Appl. No. 10/051,344, filed Jan. 18, 2002, Nusser et al.

* cited by examiner

PERSISTENT ACCESS CONTROL OF PROTECTED CONTENT

BACKGROUND OF THE INVENTION

1. Field of the Invention

This invention generally relates to the field of access control of content and more specifically to persistent access control of content.

2. Description of Related Art

As the use of the Internet has increased over recent years, so has the exchange of information and ideas. File sharing, in particular, has enjoyed increasing popularity over the last few years. However, the growth of the Internet has posed some interesting obstacles in the field of access control of protected content. As users increasingly send and receive files quickly and in great quantities, access control can take a back seat to the free flow of information. Early approaches to the problem involved control over the acquisition of the content. However, this approach lacked the exercise of control over the content once the content was acquired by a user. As a result, new approaches have emerged for protecting the use of content.

A well-known approach to the problem of protected content is described in FIG. 1. FIG. 1 is a block diagram illustrating the overall system architecture of a prior art protected content system. FIG. 1 is directed towards a Business-to-Consumer (B-to-C) paradigm. A content provider 102 creates content and interacts with store 112, via network 110, for the creation of an access control policy associated with the content. The content is then wrapped in an encrypted content file that includes the access control policy created. The content file is then stored in a data storage server 104. In addition, store 112 interacts with clearinghouse 108, via network 110, to promulgate the proper authorization for access to the content.

Subsequently, a client 106 acquires the content file by interacting with store 112 and receiving the content file from the store 112 or the data storage server 104. Then, the client 106 attempts to acquire access to the content in the content file by interacting with the clearinghouse 108 and obtaining authorization to access the content. The clearinghouse 108 determines whether the client 106 has authorization to access the content in the content file by accessing the access control policy embedded in the content file.

This approach is tailored to the B-to-C market place, where the access control policy is embedded in the content file and any changes to the access control policy requires changes to each content file. Also, since the access control policy is embedded in the content file, there is no interaction required with the content owner. Thus, once a client 106 has downloaded a content file, the content owner no longer has the power to regulate access control. In addition, this approach is directed to a B-to-C paradigm, as opposed to a Business-to-Business (B-to-B) paradigm. As the number of company networks increases, there is a need for an access control policy system that can be implemented over a LAN or WAN.

Another solution to the problem of protected content is the B-to-B paradigm. A B-to-B network includes a system-wide solution to controlling access to protected content. Typically, a server information processing system on a company LAN or WAN controls access to protected content on client systems. In this system, a client application executes on the computer systems of clients, which communicates with the server system and allows access to protected content in accordance with access control policies issued by the server system. Examples of such a system is the PageRecall application produced by Authentica Inc. of Waltham, Massachusetts, and the Enterprise 3.0 application produced by Alchemedia Inc. of Grapevine, Calif. Although these applications are useful for protecting content, they do have their shortcomings. The PageRecall application requires each piece of content to be registered with an administering server. This can be a problem when there no network connection available to a user. In addition, the PageRecall application converts all documents to a Portable Document Format (PDF) file in order to maintain content as read-only. This is disadvantageous as it does not allow for editing of content.

Therefore a need exists to overcome the problems with the prior art as discussed above, and particularly for a way to control access to protected content once the protected content is located at a client system.

SUMMARY OF THE INVENTION

Briefly, in accordance with the present invention, disclosed is a system, method and computer readable medium for providing persistent access control of protected content. In an embodiment of the present invention, the method on a client information processing system (i.e., the client) includes sending a first request for authentication of the client to a server information processing system (i.e., the server). Subsequently, if the client is authenticated by the server, then a reply including an authentication is received by the client from the server. The term "authentication" is described in greater detail below. Next, a user on the client attempts to access a file comprising a trailer and content encrypted with an encrypting key. The term "access" is described in more detail below. Then, a second request for access to the content is sent to the server by the client, wherein an identifier from the trailer is included in the second request. The identifier identifies the content or an access control policy of the content. If the server determines that the second request is in accordance with an access control policy associated with the content, then a reply is sent to the client from the server, wherein the reply includes a grant of access to the content. Lastly, the client accesses the content in accordance with an access control policy associated with the content.

This embodiment of the present invention is advantageous as it allows for persistent control of access to protected content by requiring authorization from a server whenever access to protected content is attempted. This feature increases protection of content and therefore decreases the incidence of misuse of protected content.

In one embodiment of the present invention, an authorization cache on the client information processing system is used to provide authorization to access content to the client. In this embodiment, upon access of protected content by the client, it is determined whether a connection to the server information processing system is available. If there is no connection to the server available, then it is determined whether authorization to access the protected content is available in the authorization cache on the client. If authorization to access the protected content is available in the authorization cache on the client, then the client accesses the content in accordance with the authorization available.

This embodiment of the present invention is advantageous as it allows for the availability of authorization to access protected content when a connection to a server providing authorization is not available. This feature increases the usability of protected content and allows a client to access protected content independent of the connectivity status of the client.

In another embodiment of the present invention, the method on a server information processing system includes the reception of a first request from a client information processing system for authentication of the client. The server then determines whether the client is authentic. If the client is authenticated by the server, then the server sends a reply including an authentication to the client. Next, a second request for access to the content is received by the server from the client. The server then determines whether the second request is in accordance with an access control policy associated with the content. If the server determines that the second request is in accordance with the access control policy associated with the content, then the server sends a reply to the client, wherein the reply includes a grant of access to the content.

This embodiment of the present invention is advantageous as it provides for content access authorization to be promulgated by a central server. This feature provides for centralized control of protected content and allows for easy modification of the access control policies associated with protected content.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter which is regarded as the invention is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DESCRIPTION OF THE PREFERRED EMBODIMENTS

Overview

The present invention, according to a preferred embodiment, overcomes problems with the prior art by providing persistent access control of protected content. The exemplary embodiments of the present invention provide a system wherein a user must receive authorization in order to access protected content in accordance with an access control policy.

Figure 1:
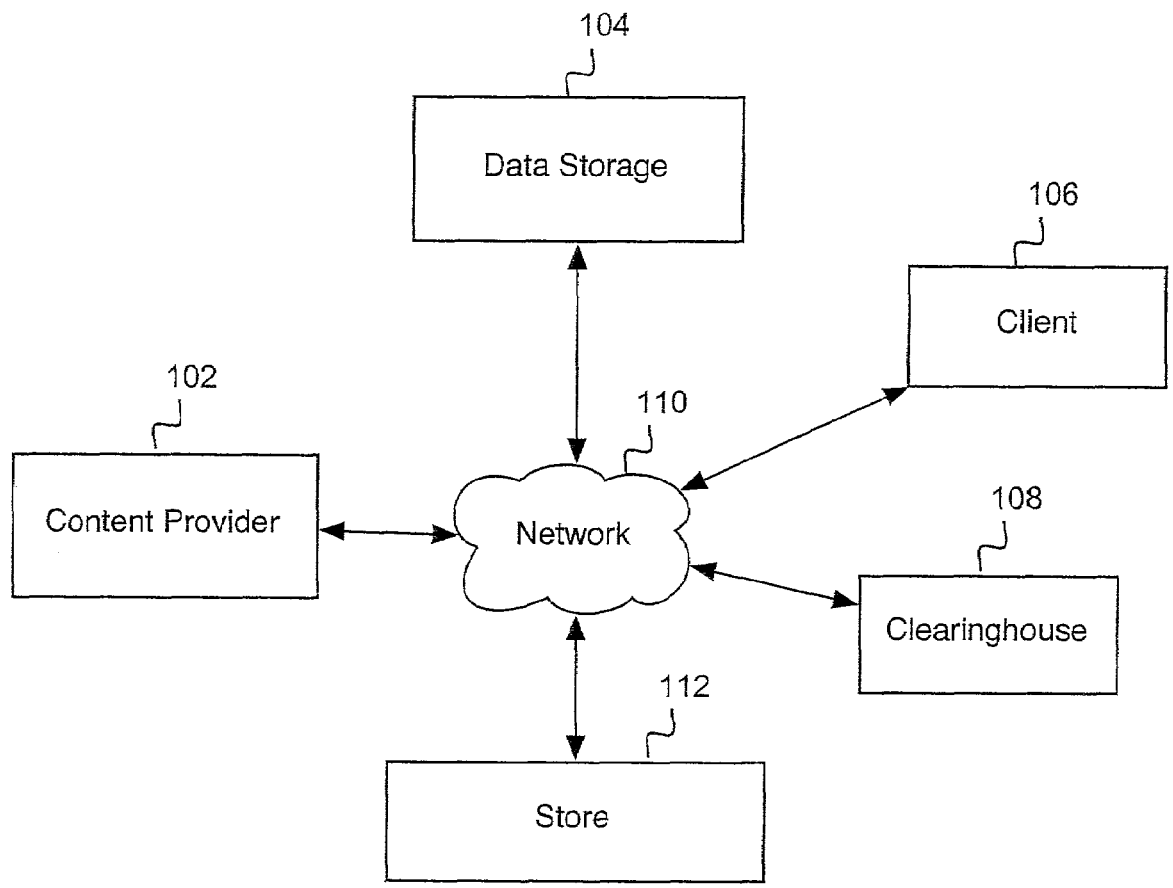
FIG. 1 is a block diagram illustrating the overall system architecture of a prior art system.
Figure 2:
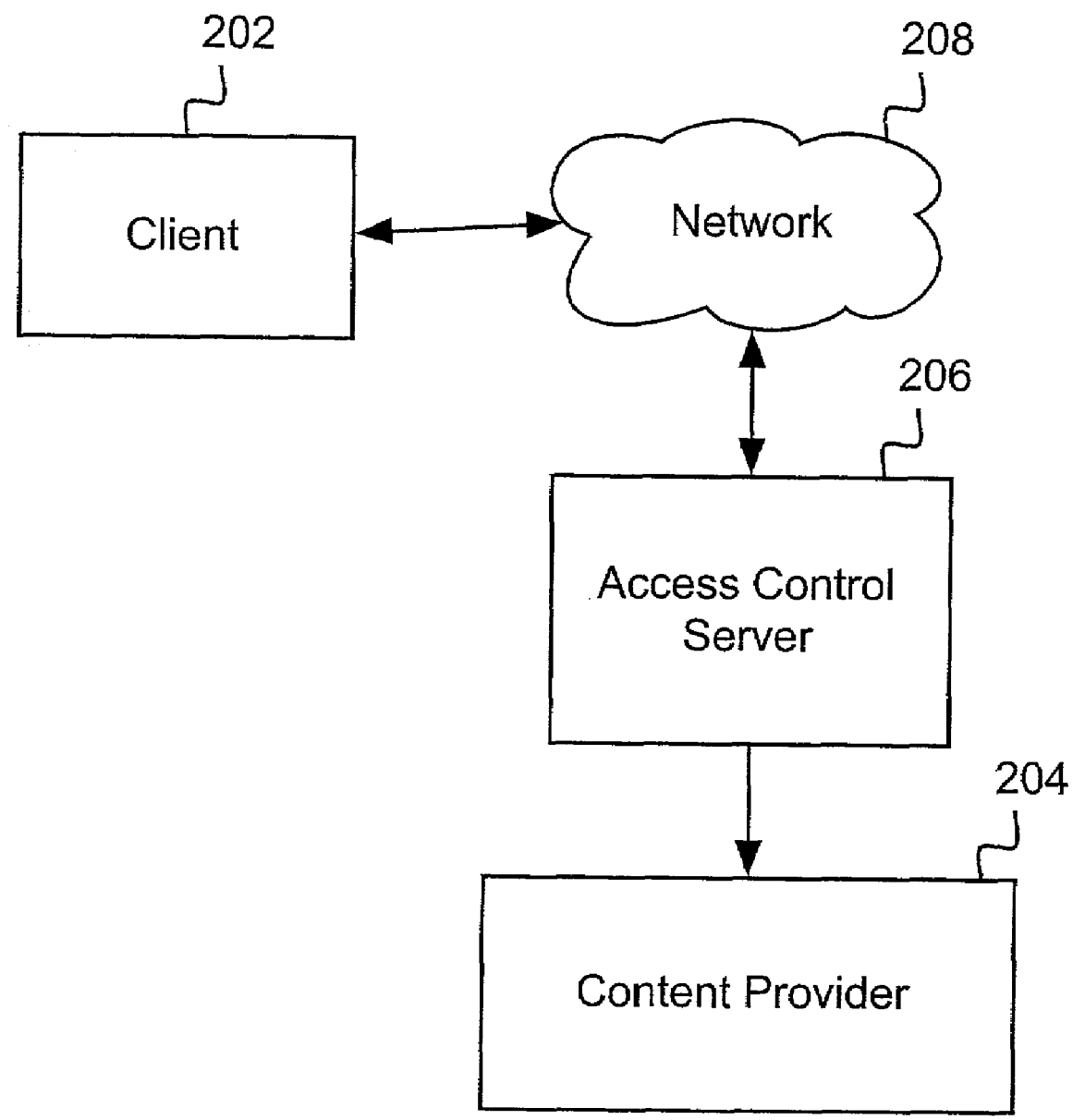
FIG. 2 is a block diagram illustrating the overall system architecture of an embodiment of the present invention.

FIG. 2 is a block diagram illustrating the overall system architecture of an embodiment of the present invention. In this embodiment, a user utilizes a client application on a client system 202 to attempt to authenticate itself to access control server 206 via a network 208. In this application, the terms "authenticate" and "authentication" are used to refer to the process of verifying the identification of a client system, a user of a client system or any combination of the two. If client 202 is authenticated by access control server 206, client 202 proceeds to download protected content from a content provider 204 via network 208 and access control server 206. (Heretofore in this application, the term "user" and "client 202" are used interchangeably because of the synergetic relationship between a user and the computer he/she controls.)

In an embodiment of the present invention, the client application on client 202 is a web browser such as Netscape Navigator or Microsoft Internet Explorer. Next, client 202 attempts to obtain authorization to access the protected content from access control server 206. If authorization to access the protected content is received from access control server 206, client 202 may then access the protected content. The term "access" is used in this application to refer to any operation performed on protected content such as opening, reading, viewing, appending, printing, annotating, erasing, or modifying of protected content.

In an embodiment of the present invention, client 202 downloads the protected content from the access control server 206. In this embodiment, the access control server 206 provides all services required by client 202 in order to practice the method of the present invention. In another embodiment of the present invention, authentication of the client 202 is provided by an authentication server (not shown) separate from the access control server 206. In this embodiment, authentication is processed by a separate entity and a grant of access to the protected content from the access control server 206 is conditioned upon the authentication of the client 202 by the authentication server. In yet another embodiment of the present invention, the client 202 executes on the same computer as access control server 206 or content provider 204. In this embodiment, the existence of network 208 is not necessary for communication between components executing on the same computer system.

In yet another embodiment of the present invention, access control server 206 acts as a gateway or conduit to other servers that provide such services as content provision, client authentication and content access authorization. In this embodiment, the client 202 contacts access control server 206 with regards to a requested service and access control server 206 either directs the client 202 to the relevant server or access control server 206 acts as a proxy between the client 202 and another server. In yet another embodiment of the present invention, access control server 206 is not necessary for the practice of the present invention. In this embodiment, client 202 acquires the content file from a source other than a network, such as on a CD or a floppy disk., and client authentication and content access authorization are performed by a server other than access control server 206.

In an embodiment of the present invention, the computer systems of client 202, content provider 204, access control server 206 and any other computer necessary for the practice of the present invention comprise one or more Personal Computers (PCs) (e.g., IBM or compatible PC workstations running the Microsoft Windows 95/98/2000/ME/CE/NT/XP operating system, Macintosh computers running the Mac OS operating system, or equivalent), Personal Digital Assistants (PDAs), game consoles or any other computer processing devices. In another embodiment of the present invention, the computer systems of content provider 204 and access control server 206 are server systems (e.g., SUN Ultra workstations running the SunOS or AIX operating system or IBM RS/6000 workstations and servers running the AIX operating system).

In an embodiment of the present invention, FIG. 2 shows network 208 for connecting client 202 to access control server 206 and content provider 204. In one embodiment of the present invention, network 208 is a circuit switched network, such as the Public Service Telephone Network (PSTN). In another embodiment of the present invention, the network 208 is a packet switched network. The packet switched network is a wide area network (WAN), such as the global Internet, a private WAN, a local area network (LAN), a telecommunications network or any combination of the above-mentioned networks. In another embodiment of the present invention, network 208 is a wired network, a wireless network, a broadcast network or a point-to-point network.

Client System

Figure 3:
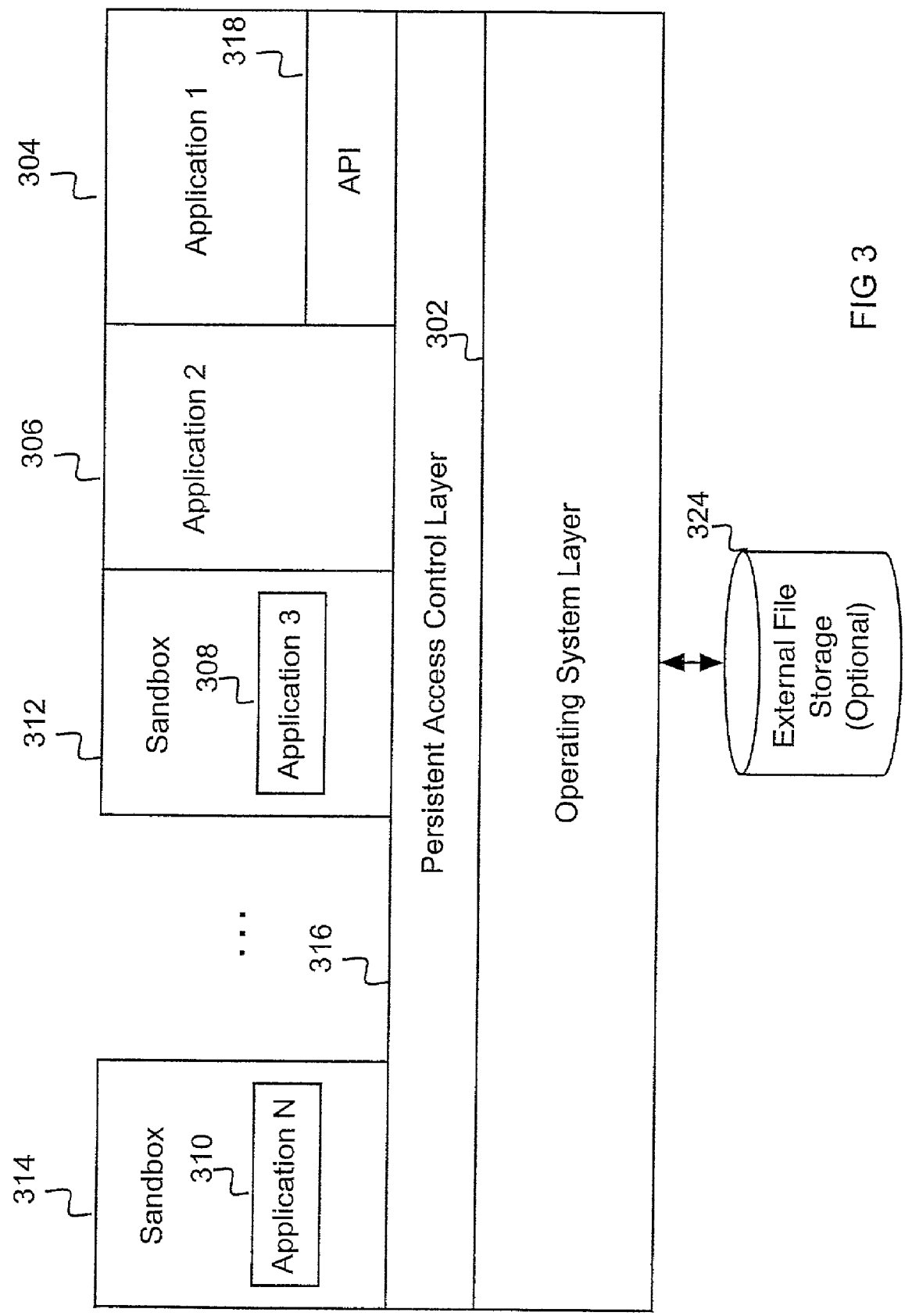
FIG. 3 is a block diagram showing a more detailed view of the software hierarchy of a client system, in an embodiment of the present invention.

FIG. 3 is a block diagram showing a more detailed view of the software hierarchy of a client information processing system, in an embodiment of the present invention. FIG. 3 provides more detail of the computer system of client 202 of FIG. 2. FIG. 3 shows an operating system 302 that controls the hardware in the computer system of client 202.

As described above, the operating system 302 is the Microsoft Windows 95/98/2000/ME/CE/NT/XP operating system, the Mac operating system, the UNIX operating system or any variation thereof e.g., the LINUX operating system, the Sun operating system or the AIX operating system. Operating system 302 controls all hardware components of the computer system of client 202, including the hard disk (which contains the file system), the processor, the memory and other peripherals. The hardware components of the computer system of client 202 are described in greater detail below in FIG. 4. External file storage 324 is any external storage device such as an external hard drive, a floppy drive or any other removable media drive.

FIG. 3 shows applications 304 to 310, i.e., applications 1 through N. Applications 1 through N are word processors, database programs, spreadsheet programs, presentation programs, image viewers, audio players, video players, multimedia players, web browsers and other custom and commercially available applications. Examples of applications 1 through N include Lotus 1-2-3, Lotus WordPro, AutoCAD, Adobe Acrobat Reader, Adobe Photoshop, Microsoft Word, Microsoft Excel, Microsoft PowerPoint, Microsoft Paint, Microsoft Media Player and Microsoft Access. Applications 1 through N access files containing protected content in the file system via PAC layer 316.

FIG. 3 also shows Persistent Access Control (PAC) layer 316 for providing a medium through which applications may access the operating system 302. Specifically, applications access files containing protected content in the file system via PAC layer 316. The PAC layer 316 controls access to the protected content in the file system within operating system 302. The PAC layer 316 also initiates the authentication process and the authorization, both of which are described in greater detail below. In an embodiment of the present invention, the PAC layer 316 is an Application Program Interface (API). In another embodiment of the present invention, the PAC layer 316 is a computer application which runs in the background of the operating system 302.

Lastly, FIG. 3 shows sandbox 312 and sandbox 314, which hold application 308 and application 310 respectively. A sandbox is an operating system extension, which intercepts or receives requests from an application, such as I/O requests. Typically, a sandbox is a computer application which executes in conjunction with a target computer application such that the sandbox restricts the execution of the target computer application. In this way, a sandbox can be used to provide security for the computer system in which the target computer application is executing.

One example of a sandbox scenario is a web browser running in conjunction with a Java Virtual Machine. A web browser allows the downloading of Java Applets (small client side programs), which execute in a sandbox created by the Java Virtual Machine. The sandbox created by the Java Virtual Machine restricts the files to which Java Applets have access and the operations that may be executed by the Java Applets. Another example of a sandbox is an API executing in conjunction with a word processing application. The API alters the functions of the word processor such that only certain functions of the word processor GUI are permitted to be executed by the user. Further examples of sandbox 312 and 314 are found in co-pending U.S. patent application Ser. Nos. 09/667,286, and 09/792,154, which are commonly assigned herewith to International Business Machines and are each incorporated by reference in their entirety.

Note that applications 2 through N (i.e., applications 306 through 310) interact with operating system 302 directly through PAC layer 316, as described above. However, application 304 does not interact directly with PAC layer 316, but rather through an API 318. In this embodiment of the present invention, the application 304 interacts with API 318, which translates or relays the requests or commands of application 304 to PAC layer 316. In this embodiment, the application 304 is provided with a layer of abstraction between itself and PAC layer 316, which increases the overall compatibility of application 304.

Also note that operating system 302 includes multiple applications 1 through N (i.e., applications 304 to 310) and multiple sandboxes (i.e., sandboxes 312 to 314). This exemplary embodiment shows that the present invention supports multiple applications and multiple sandboxes and the teachings of the present invention are not limited to a specific implementation.

Exemplary Implementations

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 4:
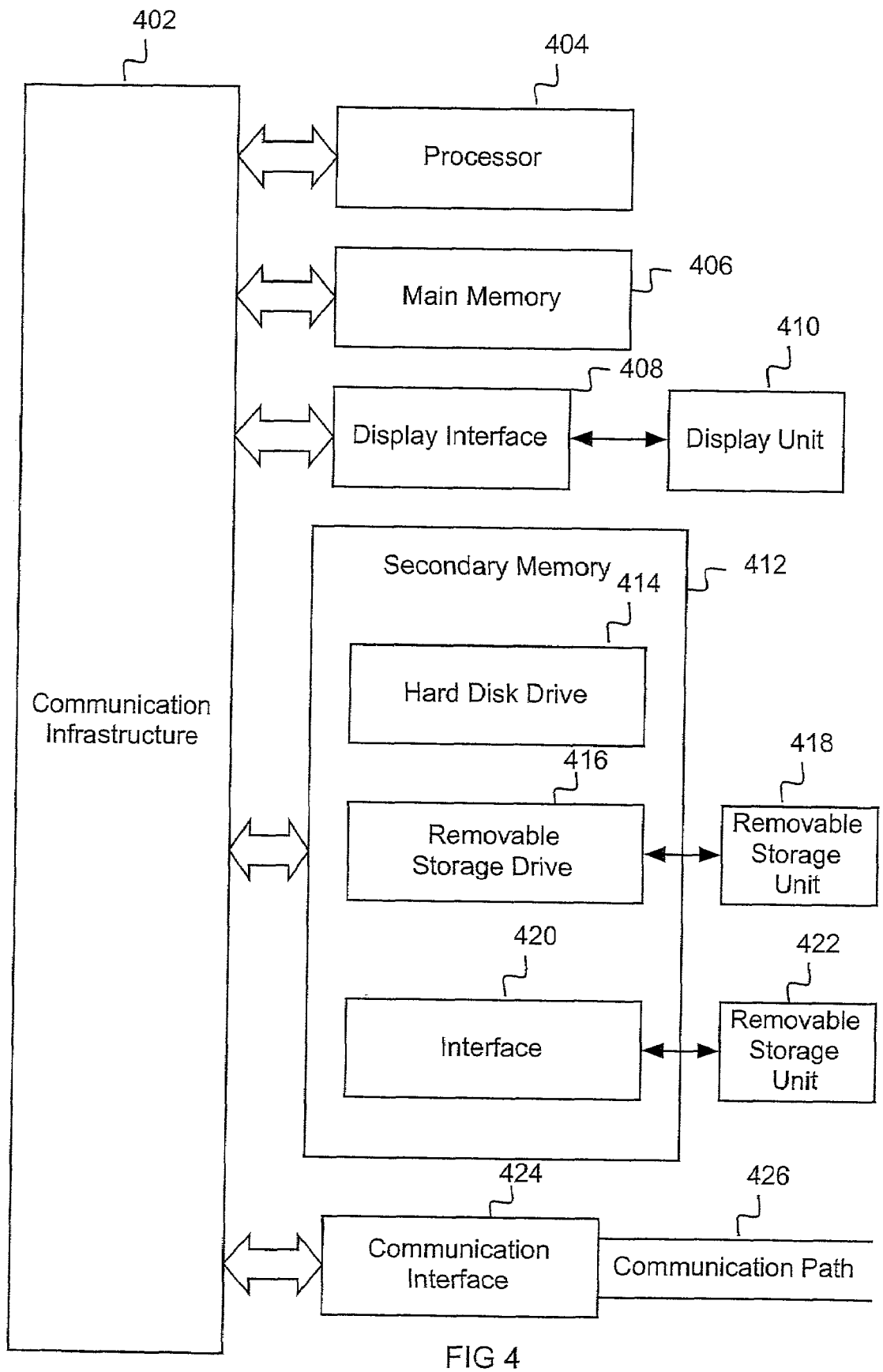
FIG. 4 is a block diagram showing a more detailed view of the hardware hierarchy of a client system, in an embodiment of the present invention.

FIG. 4 is a block diagram depicting the hardware hierarchy of a computer system useful for implementing an embodiment of the present invention. The computer system includes one or more processors, such as processor 404. The processor 404 is connected to a communication infrastructure 402 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 408 that forwards graphics, text, and other data from the communication infrastructure 402 (or from a frame buffer not shown) for display on the display unit 410. The computer system also includes a main memory 406, preferably random access memory (RAM), and may also include a secondary memory 412. The secondary memory 412 may include, for example, a hard disk drive 414 and/or a removable storage drive 416, representing a floppy disk drive, a magnetic tape drive, an optical disk drive, etc. The removable storage drive 416 reads from and/or writes to a removable storage unit 418 in a manner well known to those having ordinary skill in the art. Removable storage unit 418, represents a floppy disk, magnetic tape, optical disk, etc. which is read by and written to by removable storage drive 416. As will be appreciated, the removable storage unit 418 includes a computer usable storage medium having stored therein computer software and/or data.

In alternative embodiments, the secondary memory 412 may include other similar means for allowing computer programs or other instructions to be loaded into the computer system. Such means may include, for example, a removable storage unit 422 and an interface 420. Examples of such may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to the computer system.

The computer system may also include a communications interface 424. Communications interface 424 allows software and data to be transferred between the computer system and external devices. Examples of communications interface 424 may include a modem, a network interface (such as an Ethernet card), a communications port, a PCMCIA slot and card, etc. Software and data transferred via communications interface 424 are in the form of signals which may be, for example, electronic, electromagnetic, optical, or other signals capable of being received by communications interface 424. These signals are provided to communications interface 424 via a communications path (i.e., channel) 426. This channel 426 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to storage media such as main memory 406 and secondary memory 412, removable storage drive 416, a hard disk installed in hard disk drive 414, and transmission media, such as signals. These computer program products are means for providing software to the computer system. The computer readable medium allows the computer system to read data, instructions, messages or message packets, and other computer readable information from the computer readable medium. The computer readable storage medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may be interfaced with a transmission medium such as a network link and/or a network interface, including a wired network or a wireless network, that allow a computer to read such computer readable information.

Computer programs (also called computer control logic) are stored in main memory 406 and/or secondary memory 412. Computer programs may also be received via communications interface 424. Such computer programs, when executed, enable the computer system to perform the features of the present invention as discussed herein. In particular, the computer programs, when executed, enable the processor 404 to perform the features of the computer system. Accordingly, such computer programs represent controllers of the computer system.

Content Files

Figure 5:
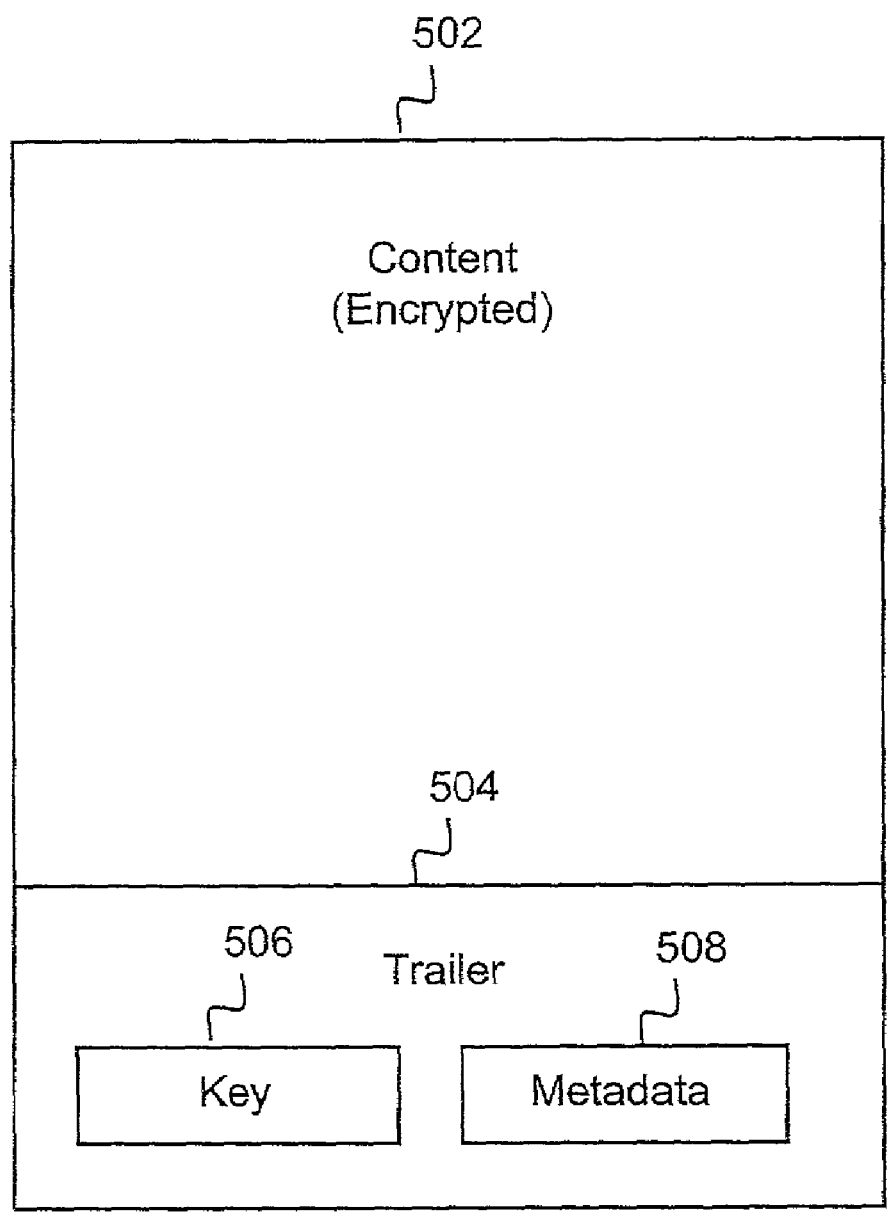
FIG. 5 is a block diagram showing a more detailed view of a content file, in an embodiment of the present invention.

FIG. 5 is a block diagram showing a more detailed view of a content file, in an embodiment of the present invention. A content file comprises two major components: the encrypted content 502 and the trailer 504. In an embodiment of the present invention, the content which is encrypted is audio data, video data, still-image data, text data, multimedia data, or any data of any other format. The encrypted content 502 comprises the protected content that has been encrypted using a first encrypting key. In an embodiment of the present invention, the encrypted content is encrypted using various encrypting schemes, such as public-key encryption, and symmetric-key encryption. In another embodiment of the present invention, the content is also hashed or digital signed for the purpose of verifying the integrity of the content.

The trailer 504 comprises the first encrypting key 506 used to encrypt the content and metadata 508. Metadata 508 includes data about the content, the content file, the encryption of the content, the access control policy of the content or any other information associated with the content. Metadata 508 is described in greater detail below.

In an embodiment of the present invention, the trailer 504 also includes a certificate, a digital signature or any other information used for authentication. In this embodiment, the certificate, digital signature or other information is used for authentication of the user attempting to access the content in the content file. This process is described in greater detail below. In another embodiment of the present invention, the trailer is not a segment or portion of the content file, as depicted in FIG. 5, but rather a separate file or data block associated with the encrypted content 502. In an embodiment of the present invention, as an alternative to a trailer 504 including a certificate, a digital signature or other information, the trailer is encrypted in a cryptographic envelope defined by the Public Key Cryptography Standard #7 format for cryptographic envelopes.

Figure 6:
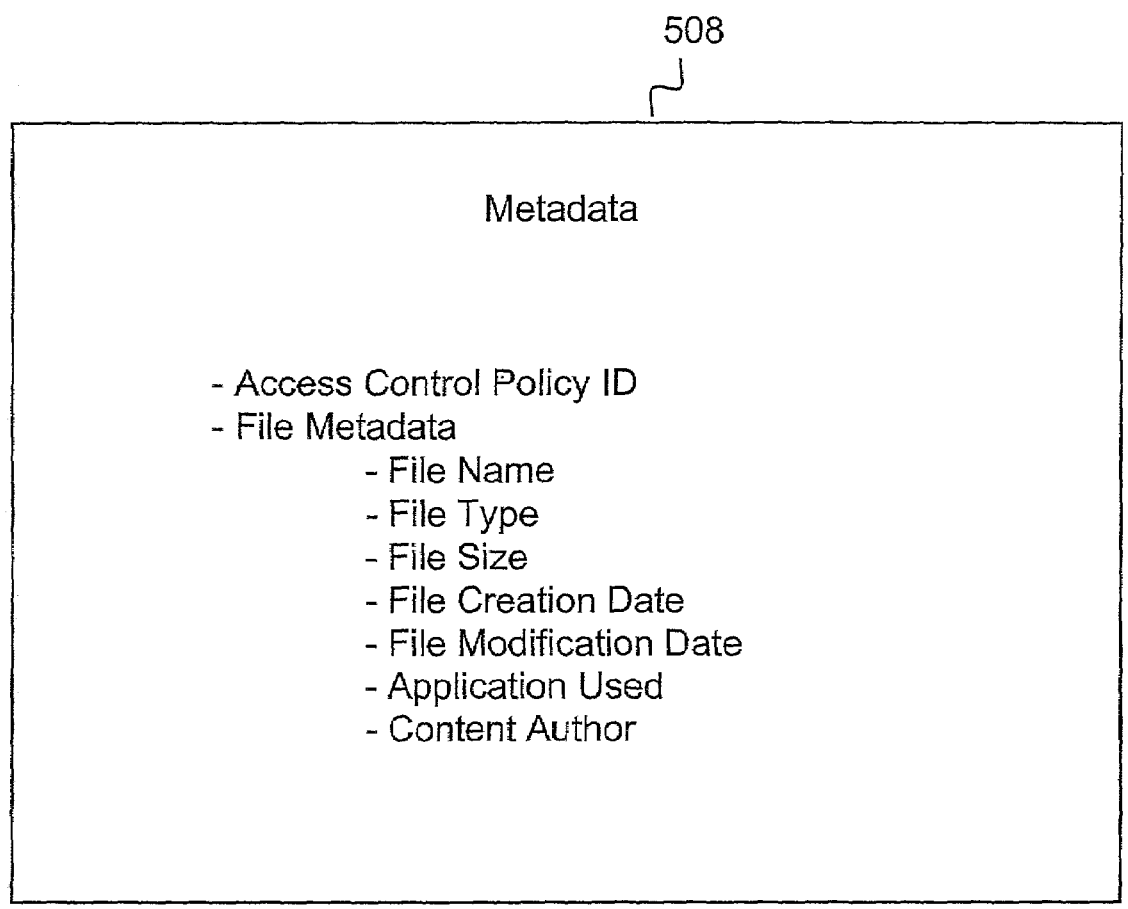
FIG. 6 is a block diagram showing a more detailed view of the metadata in a content file, in an embodiment of the present invention.

FIG. 6 is a block diagram showing a more detailed view of the metadata 508 in a content file, in an embodiment of the present invention. FIG. 6 shows the various types of metadata 508 that may be stored in the trailer 504 of a content file. Metadata 508 includes metadata typically associated with a file. This includes file name, file type, file size, file creation date, file modification data, application used and content author or owner. In addition, metadata 508 includes an access control policy identifier. This identifier identifies an access control policy associated with the content in the content file. This identifier is used by the client 202 to relay to the access control server 206 the access control policy associated with the content. This operation described in greater detail below.

Note that the access control policy is not defined in the content file of FIG. 5, but rather the access control policy is defined on a remote server. Only an access control policy identifier is defined in the trailer 504 of the content file. This feature is advantageous because it allows for centralized control of an access control policy. This results in ease of maintenance of access control policies. In addition, locating access control policies separately from content files allows for modifications to the access control policies to occur in one location as opposed to each content file. Moreover, the use of a persistent access control policy identifier is advantageous as it allows an access control policy to be integrated with a content file.

In an embodiment of the present invention, metadata 508 includes a content identifier that identifies the content in the content file. This identifier is used by the client 202 to relay to the access control server 206 the identity of the content in the content file. The access control server 206 then used this information to determine which access control policy is associated with the content identified by the content identifier.

Operation of the Invention

Figure 7:
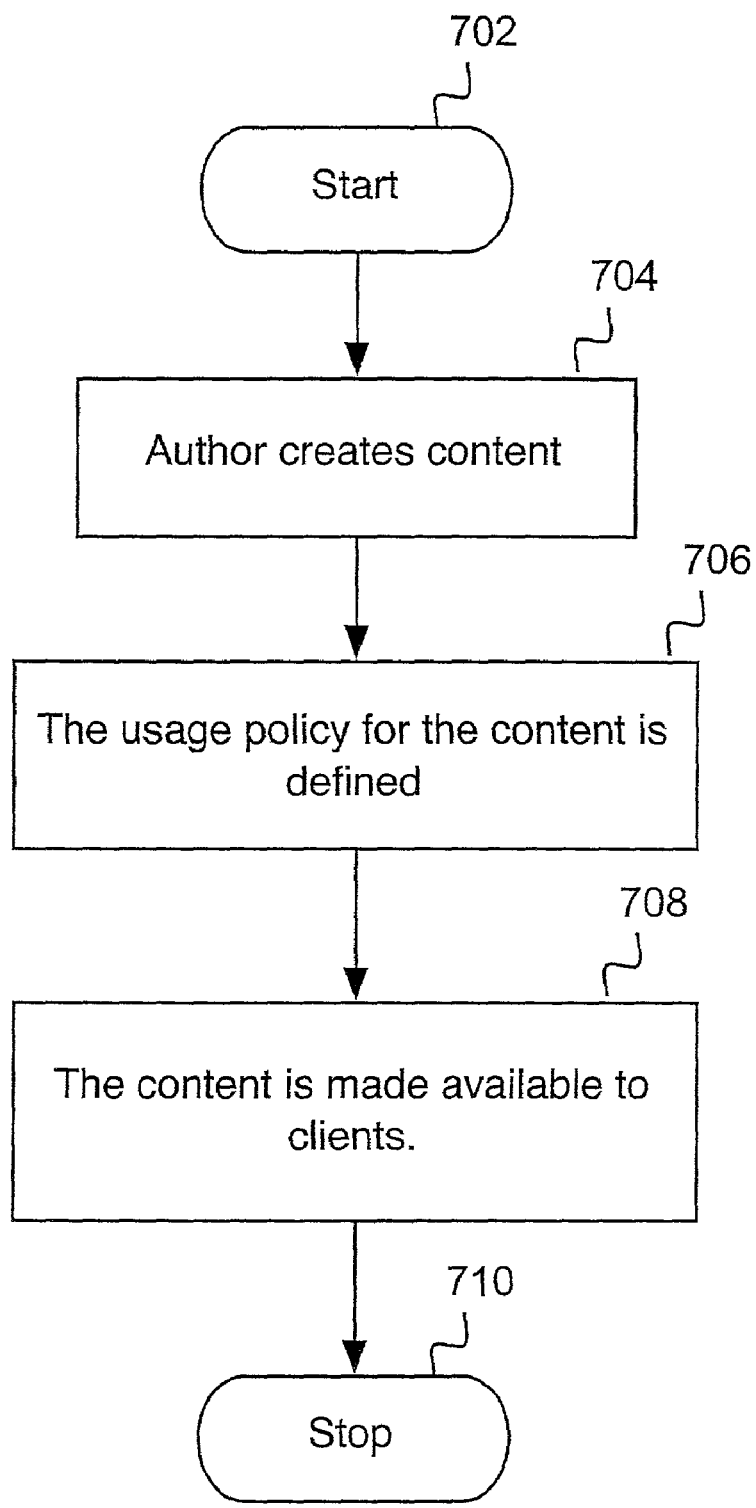
FIG. 7 is a flowchart depicting the operation and control flow of the content creation process on a client system, in one embodiment of the present invention.

FIG. 7 is a flowchart depicting the operation and control flow of the content creation process on a client system, in one embodiment of the present invention. The control flow of FIG. 7 begins with step 702 and flows directly to step 704. In step 704, FIG. 7 shows that an author creates content. In an embodiment of the present invention, the author prepares a text document, creates a still image, records a sound file, or records video. Next, in step 706, the usage policy of the content is defined.

In an embodiment of the present invention, the access control policy of the content is defined by the author or any other entity associated with the content, such as the company in which the author is employed. The access control policy defines in detail the actions that are permitted to be executed upon the content and the users which have the permissions to perform these actions upon the content. In this embodiment, the defined access control policy is provided to a central server, such as access control server 206 or any other authorization server which promulgates authorization to access the content. The access control policy is defined in greater detail below.

In an embodiment of the present invention, the content is encrypted immediately upon storage of the content file onto a disk. In this embodiment, the author creates the content using an application that regulates the protection of content. This application, such as PAC layer 316, is transparent to the author and encrypts the content as it is saved to a file. In one embodiment, the application encrypts the content file using a cryptographic envelope, as described above.

In step 708, the content is made available to other clients. In an embodiment of the present invention, the created content is provided to a central server, such as content provider 204 or any other server that provides the created content to other clients. In another embodiment of the present invention, the author himself provides the created content to other clients. In step 710, the control flow ceases.

Figure 8:
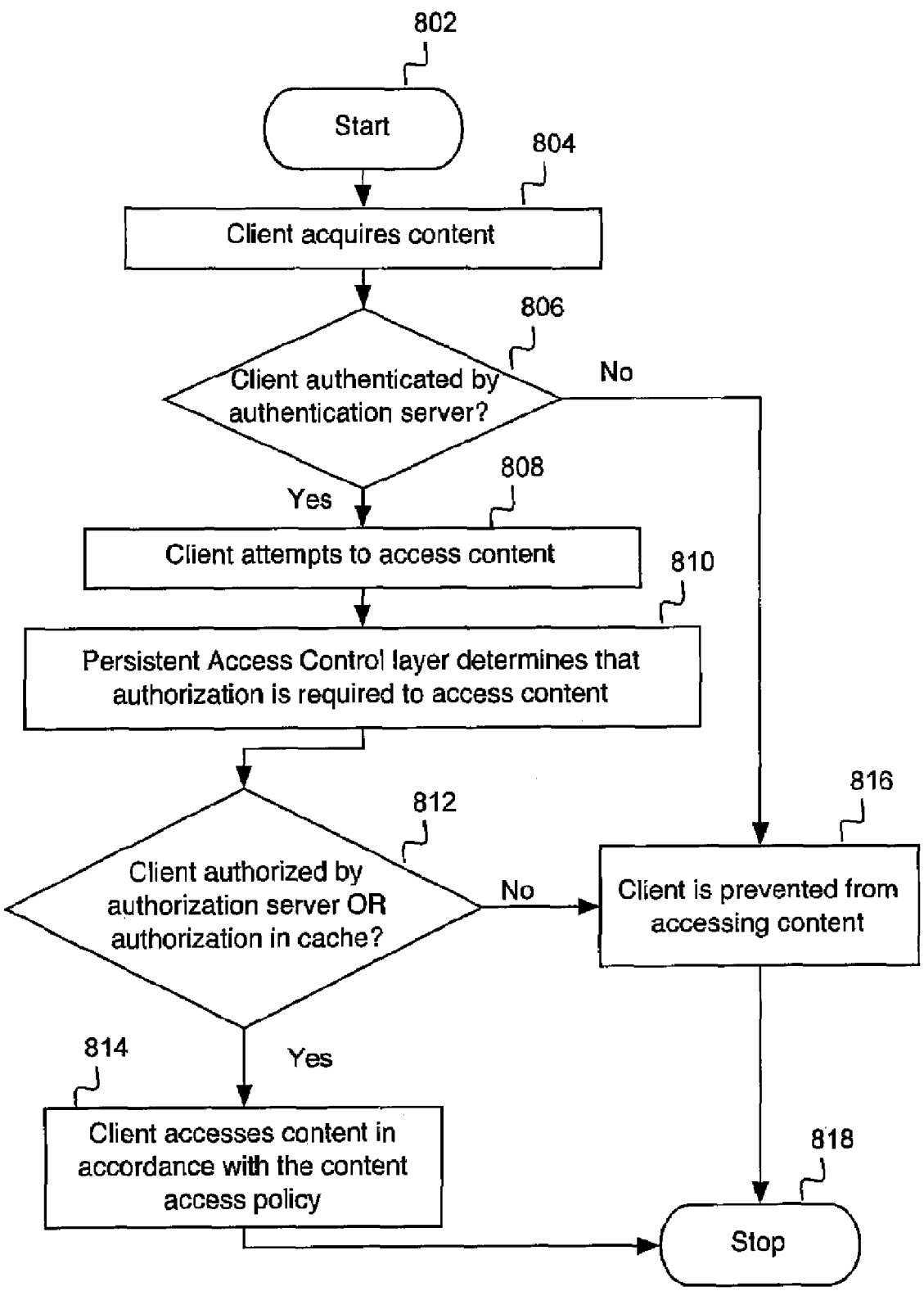
FIG. 8 is a flowchart depicting the operation and control flow of the content access process in a client system, in one embodiment of the present invention.

FIG. 8 is a flowchart depicting the operation and control flow of the content access process in a client system, in one embodiment of the present invention. FIG. 8 depicts the overall process that is executed when a user on a client 202 accesses protected content. The control flow of FIG. 8 begins with step 802 and flows directly to step 804. In step 804, FIG. 8 shows that a user on client 202 acquires a content file, as shown in FIG. 5. In an embodiment of the present invention, the client 202 acquires a content file from a content provider 204, as depicted in FIG. 2, or directly from an author or any other party, as described in the control flow of FIG. 7.

In the case where the client 202 acquires a content file from a content provider 204, in an embodiment of the present invention, the content provider 204 encrypts the content file before it is sent to or downloaded by the client 202. In this embodiment, the content file is encrypted using a cryptographic envelope, as described above.

In step 806, it is determined whether the client 202 is authenticated. The determination of step 806 is performed by PAC layer 316 in conjunction with a remote server such as access control server 206. If the determination of step 806 is positive, control flows to step 816. Otherwise, control flows to step 808.

In step 808, the user of client 202 attempts to access the content in the content file. In an embodiment of the present invention, client 202 attempts to perform an action upon the content file, such as opening the content in the content file using an application or modifying the content in the content file using an application.

In step 810, the PAC layer 316 determines that authorization is required for access to the content. As the user of client 202 attempts to perform an action upon the content in the content file in step 808, the PAC layer 316, in step 810, intercepts or receives this request and proceeds to attempt to gain authorization for performing the action. The determination of step 810 is performed by PAC layer 316 in conjunction with a remote server such as access control server 206. The authorization process is described in greater detail below.

In step 812, it is determined whether the client 202 is authorized to access the content. In an embodiment of the present invention, the determination of step 812 is performed by PAC layer 316 in conjunction with a remote server such as access control server 206. The authorization process is described in greater detail below. In another embodiment of the present invention, in step 812, it is only determined whether authorization for access to the protected content is available from an authorization cache. In this embodiment, the determination of step 812 is performed solely by PAC layer 316. If the result of the determination of step 812 is positive, control flows to step 814. Otherwise, control flows to step 816.

In step 814, it is determined that the client 202 is authorized to access the protected content and the client 202 proceeds to access the protected content in accordance with the access control policy. In step 816, it is determined that the client 202 is not authorized to access the protected content and the client 202 is prohibited from accessing the protected content in accordance with the access control policy. In step 818, the control flow ceases.

Figure 9:
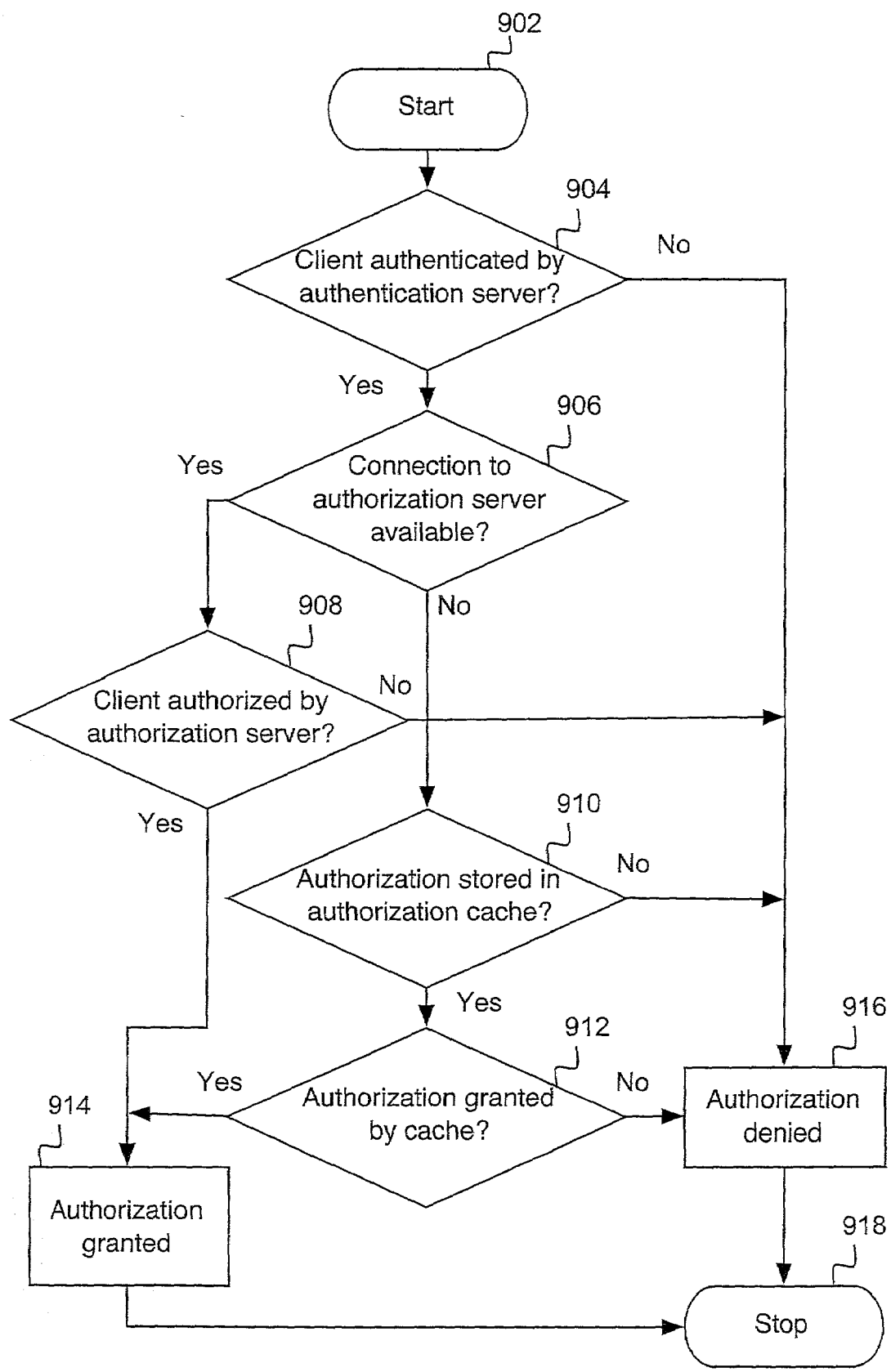
FIG. 9 is a flowchart depicting the operation and control flow of the authentication and authorization acquisition process in a client system, in one embodiment of the present invention.

FIG. 9 is a flowchart depicting the operation and control flow of the authentication and authorization acquisition process in a client system, in one embodiment of the present invention. FIG. 9 depicts the process that is executed when client 202 attempts to acquire authorization to access protected content. FIG. 9 corresponds to step 810 of FIG. 8.

The control flow of FIG. 9 begins with step 902 and flows directly to step 904. In step 904, a request is sent by client 202 to the authentication server for the purpose of being authenticated. The authentication server then determines whether the client 202 is authentic. In an embodiment of the present invention, the request sent to the authentication server includes a digital signature, a certificate, a password, a login name, or any other information useful for establishing the identity of client 202. If the result of the determination of step 904 is affirmative, then control flows to step 906. Otherwise, control flows to step 916.

In step 906, it is determined whether a network connection to the entity providing content access authorization, an authorization server, is available. In an embodiment of the present invention, in step 906, it is determined whether a network connection to access control server 206 is available. If the result of the determination of step 906 is affirmative, then control flows to step 908. Otherwise, control flows to step 910.

In step 910, FIG. 9 shows that it is determined whether authorization for access to the protected content is stored in the authorization cache. The authorization cache is a storage area on client 202, wherein authorizations for access to different content files are stored. This is beneficial for instances where the client 202 is unable to communicate with an authorization, such as when there is no working network connection available to client 202. If the result of the determination of step 910 is affirmative, then control flows to step 912. Otherwise, control flows to step 916.

In step 912, it is determined whether the authorization stored in the authorization cache allows the client 202 to access the content. If the result of the determination of step 912 is affirmative, then control flows to step 914. Otherwise, control flows to step 916.

In step 908, a request is sent by client 202 to the authorization server for the purpose of obtaining authorization to access protected content. The access control server 206 then determines whether the client 202 is authorized to access the protected content in accordance with an access control policy associated with the protected content.

In an embodiment of the present invention, the request sent to the authorization server includes a digital signature, a certificate or any other information useful for establishing the identity of client 202. In addition, the request sent to the authorization server includes an access control policy identifier for identifying the access control policy associated with the protected content. Lastly, the request sent to the authorization server includes information regarding the type of access desired to be performed on the protected content, such as reading, modifying or appending. The manner in which the authorization server determines whether the client 202 is authorized to access the protected content is described in greater detail below. If the result of the determination of step 908 is affirmative, then control flows to step 914. Otherwise, control flows to step 916.

In step 914, authorization to access the protected is granted to client 202. This operation is described in greater detail below. The client 202 is then allowed to access the protected content. In step 916, authorization to access the protected is denied for client 202. The client 202 is then prohibited from accessing the protected content. In step 918, the control flow of FIG. 9 ceases.

It should be noted that the actions described above for the control flow of FIG. 9, when not attributed to a separate server, are substantially executed by a client application on client 202. Specifically, these actions are executed by PAC layer 316 of FIG. 3. When actions are attributed to a separate server, such as an authorization server or an authentication server, then these actions are alternatively substantially executed by the access control server 206, which can integrate the functions of an authorization server and an authentication server.

Figure 10:
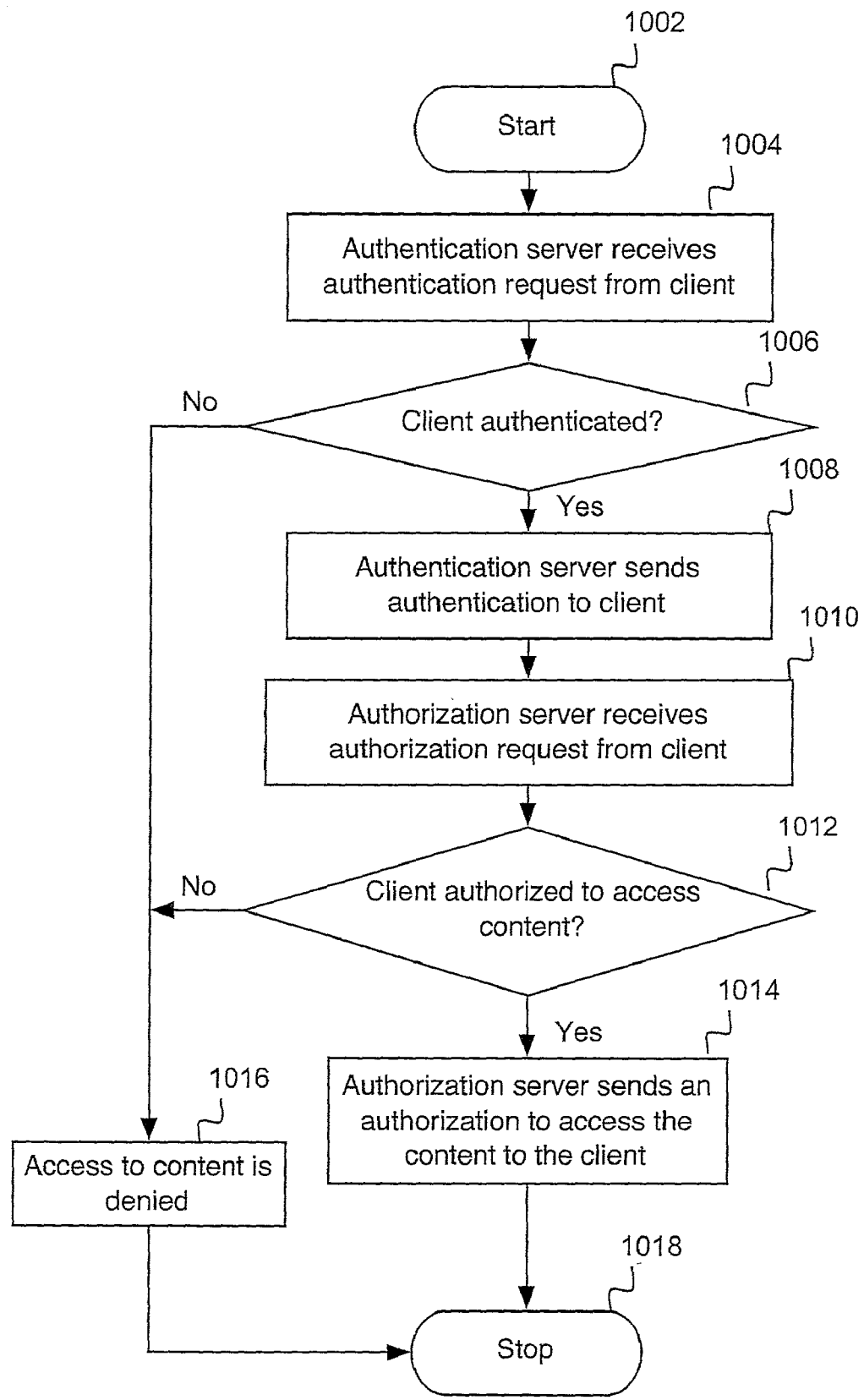
FIG. 10 is a flowchart depicting the operation and control flow of the authorization process in an authorization server system, in one embodiment of the present invention.

FIG. 10 is a flowchart depicting the operation and control flow of the authorization process in an authorization server system, in one embodiment of the present invention. FIG. 10 depicts the process that is executed by a server application in a server system when client 202 attempts to acquire authorization from the server system to access protected content. FIG. 10 corresponds to step 810 of FIG. 8 and step 908 of FIG. 9. In an embodiment of the present invention, in the control flow of FIG. 10, the access control server 206 performs the authentication and authorization functions of the present invention. In another embodiment of the present invention, as described above, the authentication and authorization functions of the present invention are performed by separate entities.

The control flow of FIG. 10 begins with step 1002 and flows directly to step 1004. In step 1004, FIG. 10 shows that the access control server 206 receives an authentication request from the client 202. The contents of this request are described in greater detail above. In step 1006, the access control server 206 determines whether the client 202 (or the user associated with client 202) is authentic. In an embodiment of the present invention, the authentication procedure of step 1006 embodies those authentication procedures that are known to one of ordinary skill in the art. One example of such an authentication procedure is to validate a password and login name provided by a user desiring authentication. If the result of the determination of step 1006 is affirmative, then control flows to step 1008. Otherwise, control flows to step 1016.

In step 1008, the access control server 206 authenticates client 202. In an embodiment of the present invention, in step 1008, the access control server 206 establishes a connection with client 202 in response to the authentication of client 202. Next, in step 1010, the access control server 206 receives a request from the client 202 for authorization to access protected content. The contents of this request are described in greater detail above. In step 1012, the access control server 206 determines whether the client 202 (or the user associated with client 202) is authorized to access the protected content. If the result of the determination of step 1012 is affirmative, then control flows to step 1014. Otherwise, control flows to step 1016.

A determination of whether the client 202 (or the user associated with client 202) is authorized to access protected content relies on the access control policy associated with the protected content. In an embodiment of the present invention, an access control policy, identified by an access control policy identifier (or a content identifier), is defined at the authorization server (in this case, the access control server 206). An access control policy defines a myriad of restrictions upon the usage of the protected content. Examples of restrictions that may exist in an access control policy are as follows:

- Restrictions on the identity of users permitted to access the content
- Restrictions on the group of users permitted to access the content
- Restrictions on the dates and times when users are permitted to access the content
- Restrictions on the types of access that are permitted (reading, modifying, appending, printing, etc.)
- Restrictions on the duration of access permitted
- Restrictions on the number of times protected content can be accessed
- Restrictions on the frequency protected content can be accessed
- Restrictions on the applications used to access the protected content
- Restrictions on the environment of the application used to access the protected content The authorization server makes the determination of whether a client 202 is authorized to access protected content by determining whether the action requested to be performed on the protected content is permitted by the access control policy associated with the protected content.

In step 1014, the access control server 206 sends an authorization to access the protected content to client 202. In an embodiment of the present invention, the authorization provided by access control server 206 includes a key used for the decryption of the content file and a message to client 202 including an affirmative response indicating authorization to access the protected content.

In step 1016, access to the protected content by client 202 is denied. In this step, access control server 206 sends a denial of access to the protected content to client 202. In an embodiment of the present invention, the authorization provided by access control server 206 includes a message to client 202 including a negative response indicating no authorization to access the protected content. In step 1018, the control flow ceases.

Figure 11:
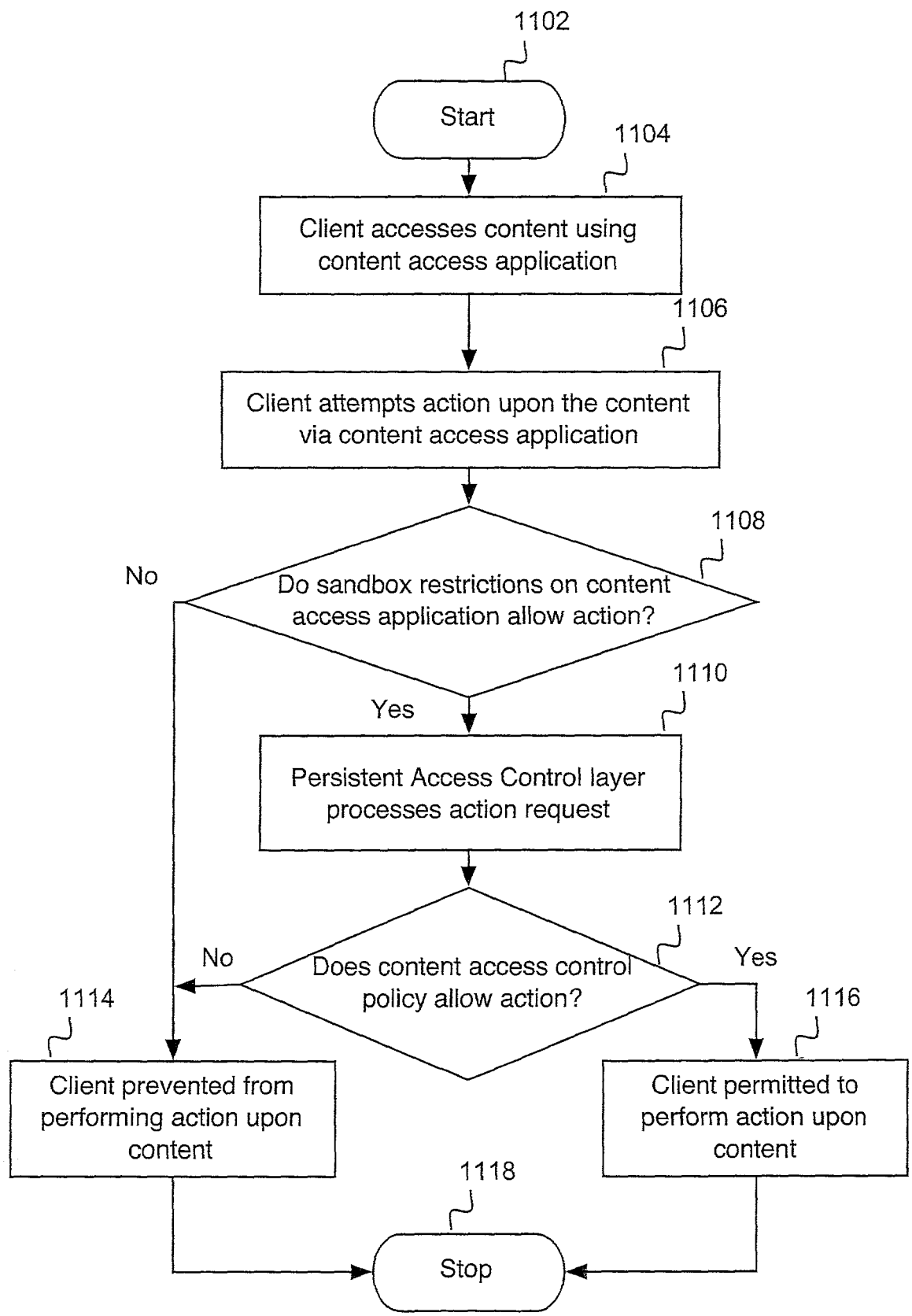
FIG. 11 is a flowchart depicting the operation and control flow of the content usage process in a client system, in one embodiment of the present invention.

FIG. 11 is a flowchart depicting the operation and control flow of the content usage process in a client system, in one embodiment of the present invention. FIG. 11 depicts the process that is executed by a client application on client 202 when a user attempts to perform an action upon protected content after the user has been authorized to access the protected content. In an embodiment of the present invention, the client application executing the steps of the control flow of FIG. 10 is the PAC layer 316 or the client application integrating the functions of the PAC layer 316. In an embodiment of the present invention, the control flow of FIG. 11 includes a sandbox as described in FIG. 3.

The control flow of FIG. 11 begins with step 1102 and flows directly to step 1104. In step 1104, FIG. 11 shows that the client 202 has gained authorization to access the protected content. Thus, the client 202 proceeds to access the protected content. In step 1106, the client 202 attempts to perform an action upon the protected content using the client application. In step 1108, it is determined whether the action attempted by client 202 is permitted by the sandbox in which the client application resides. If the result of the determination of step 1108 is affirmative, then control flows to step 1110. Otherwise, control flows to step 1114.

In step 1110, the PAC layer 316 processes the request to perform an action upon the protected content. In this step, the PAC layer initiates the authentication and authorization processes described in FIG. 9. In step 112, it is determined whether the authentication and authorization processes resulted in an authorization to performed the desired action upon the protected content. If the result of the determination of step 1112 is affirmative, then control flows to step 1116. Otherwise, control flows to step 1114. In step 1114, the client 202 is prevented from performing the desired action upon the protected content. In step 1116, the client 202 is permitted to perform the desired action upon the protected content. In step 1118, the control flow ceases.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for providing content protection on a client information processing system, the method on the client information processing system comprising:

sending a request to a server information processing system for access to a file residing at the client information processing system using a client application, wherein the file comprises content encrypted with a first encrypting key and metadata associated with the content and wherein the request includes an access control policy identifier from the metadata for enabling the server information processing system to identify at least one access control policy associated with the content, wherein the access control policy identifier is separate and distinct from content identification data for identifying the content, and wherein the request comprises at least one type of access required;

receiving a reply to the request from the server information processing system, wherein the reply includes a grant of access to the content in response to the server information processing system determining that the request is in accordance with a set of access control policy associated with the content, and wherein the set of access control policies remains with the server information processing system and is not transmitted to the client information processing system; and accessing the content in the file using the client application in response to the reply that is received from the server information processing system.

2. The method of claim 1, wherein the metadata and the first encrypting key reside within a trailer associated with the content, and wherein the first encrypting key is encrypted so that only the server information processing system can access the first encrypting key.

3. The method of claim 2, wherein the metadata in the trailer includes at least one of:

a file name;
a file size;
a file modification date;
a file type;
a file creation date;

a content creation application used to create the content in the file; and an author of the content in the file.

4. The method of claim 2, wherein the metadata comprises a certificate for authenticating to the server information processing system any one of:

the client information processing system; and a user utilizing the client information processing system.

5. The method of claim 1, wherein the at least one type of access required is one of:

a request to read the content;

a request to append to the content;

a request to print the content; and a request to modify the content.

6. The method of claim 5, wherein the content comprises any one of:

text data;

audio data;

still-image data;

video data; and multimedia data.

7. The method of claim 1, wherein the accessing comprises:

accessing, by the client application, the content in the file via an API, wherein the API allows access to the content in the file in accordance with the reply to the request from the server information processing system.

8. The method of claim 7, wherein the API modifies at least one function of the client application in accordance with the reply to the request from the server information processing system.

9. The method of claim 1, wherein the metadata associated with the content resides in a file that is separate and distinct from the content.

10. The method of claim 1, wherein the request further comprises a digital signature for enabling the server information processing system to identify the client information processing system.

11. A method for providing content protection on a client information processing system, the method on the client information processing system comprising:

acquiring on the client information processing system a file comprising content encrypted with a first encrypting key and a trailer related to the content;

determining whether a connection to a server information processing system for access to the content is available, wherein the server information processing system comprises a set of access control policies, the set of access control policies remains with the server information processing system and is not transmitted to the client information processing system;

wherein if the connection to the server information processing system is not available, determining if authorization for access to the content is cached in the client information processing system; and wherein if authorization for access to the content is cached in the client information processing system, accessing the content in the file using a client application, wherein authorization for access that is cached is an indication of prior authorization by the server information processing system.

12. A method on a server information processing system for providing authorization for access to content, the method on the server information processing system comprising:

coupling communicatively a server information processing system to a set of access control policies;

receiving a request from the client information processing system for access to content in a file residing at the client information processing system, wherein the file includes metadata associated with the content, and wherein the request includes an access control policy identifier from the metadata, wherein the access control policy identifier is separate and distinct from content identification data for identifying the content, wherein the request comprises at least one type of access required;

identifying at least one access control policy associated with the content based on the identifier;

identifying at least one type of access type required by the client information processing system based on the access type information;

determining whether the request is in accordance with the access control policy associated with the content; and wherein if the request is in accordance with the access control policy associated with the content, wherein the access control policy is included in the set of access control policies, the set of access control policies remains with the server information processing system and is not transmitted to the client information processing system, sending a reply to the request to the client information processing system, wherein the reply includes a grant of access to the content to the client information processing system.

13. A computer readable storage medium including computer instructions for providing content protection on a client information processing system, the computer instructions providing instructions for:

sending a request to a server information processing system for access to a file residing at the client information processing system using a client application, wherein the file comprises content encrypted with a first encrypting key and metadata associated with the content and wherein the request includes an access control policy identifier from the metadata for enabling the server information processing system to identify at least one access control policy associated with the content, wherein the access control policy identifier is separate and distinct from content identification data for identifying the content, and wherein the request comprises at least one type of access required;

receiving a reply to the request from the server information processing system, wherein the reply includes a grant of access to the content in response to the server information processing system determining that the request is in accordance with a set of access control policy associated with the content, and wherein the set of access control policies remains with the server information processing system and is not transmitted to the client information processing system; and accessing the content in the file using the client application in response to the reply that is received from the server information processing system.

14. The computer readable storage medium of claim 13, wherein the metadata and the first encrypting key reside within a trailer associated with the content, and wherein the first encrypting key is encrypted so that only the server information processing system can access the first encrypting key.

15. The computer readable storage medium of claim 14, wherein the metadata in the trailer includes at least one of:

a file name;

a file size;

a file modification date;

a file type;

a file creation date;

a content creation application used to create the content in the file; and an author of the content in the file.

16. The computer readable storage medium of claim 14, wherein the metadata comprises a certificate for authenticating to the server information processing system any one of: the client information processing system; and a user utilizing the client information processing system.

17. A client information processing system for providing content protection, the system comprising:

a file comprising content encrypted with a first encrypting key and metadata related to the content;

a request to the server information processing system for access to the content, wherein the request includes an access control policy identifier from the metadata related to the content for enabling the server information processing system to identify at least one access control policy associated with the content, wherein the access control policy identifier is separate and distinct from content identification data for identifying the content, and wherein the request comprises at least one type of access required; and a reply to the request from the server information processing system, wherein the reply includes a grant of access to the content, wherein the access control policy is included in the set of access control policies, the set of access control policies remains with the server information processing system and is not transmitted to the client information processing system.

18. A server information processing system for providing authorization for access to content, the system comprising:

a set of access control policies for granting access to content in a file on at least one client information processing system;

a request from the client information processing system for access to the content including metadata associated with the content, wherein the request includes an access control policy identifier from the metadata for enabling the identification of at least one access control policy associated with the content, wherein the access control policy identifier is separate and distinct from content identification data for identifying the content, and wherein the request comprises at least one type of access required; and a reply to the request to the client information processing system, wherein the reply includes a grant of access to the content to the client information processing system, wherein the set of access control policies includes the access control policy associated with the client information processing system, the set of access control policies remains with the server information processing system and is not transmitted to the client information processing system.

19. The system of claim 18, wherein the authentication of the client processing system is performed with an authentication information system and the grant of a access is provided by an access control information processing system, the authentication information processing system being separate and distinct from the access control information processing system.

20. The system of claim 19, wherein the access control information processing system is a gateway between the client information processing system and additional server information processing systems providing services requested by the client information processing system.

* * * * *

UNITED STATES PATENT AND TRADEMARK OFFICE
CERTIFICATE OF CORRECTION

PATENT NO. : 7,614,077 B2 Page 1 of 1
APPLICATION NO. : 10/121033
DATED : November 3, 2009
INVENTOR(S) : Brew et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1236 days.

Signed and Sealed this

Nineteenth Day of October, 2010

David J. Kappos
*Director of the United States Patent and Trademark Office*